US007221467B2

(12) United States Patent
Hayashi et al.

(10) Patent No.: US 7,221,467 B2
(45) Date of Patent: May 22, 2007

(54) IMAGE FORMING APPARATUS AND REPLACEABLE PART AND INTEGRATED CIRCUIT CHIP FOR THE SAME

(75) Inventors: Takamasa Hayashi, Tokyo (JP); Hiroyuki Nagashima, Kanagawa (JP); Toshitaka Semma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 877 days.

(21) Appl. No.: 09/994,620

(22) Filed: Nov. 28, 2001

(65) Prior Publication Data

US 2002/0063890 A1 May 30, 2002

(30) Foreign Application Priority Data

Nov. 29, 2000 (JP) ............................ 2000-363140

(51) Int. Cl.
*G06F 15/00* (2006.01)
*G03G 15/08* (2006.01)

(52) U.S. Cl. ....................................... 358/1.15; 399/27

(58) Field of Classification Search ............... 358/1.15, 358/1.18, 1.16, 1.13, 1.14; 347/19, 40, 37, 347/7, 218; 235/492, 383; 399/27, 12, 8; 379/428, 433; 400/621, 691
See application file for complete search history.

(56) References Cited

U.S. PATENT DOCUMENTS 5,995,774 A * 11/1999 Applegate et al. ............ 399/27
6,658,219 B1 * 12/2003 Ito et al. ....................... 399/27

FOREIGN PATENT DOCUMENTS

| | | |
|---|---|---|
| EP | 0 743 567 | 11/1996 |
| EP | 0 858 012 | 8/1998 |
| EP | 0 985 537 | 3/2000 |
| JP | 08/069212 | 3/1996 |

(Continued)

OTHER PUBLICATIONS

U.S. Appl. No. 09/994,620, filed Nov. 28, 2001, Hayashi et al.

(Continued)

*Primary Examiner*—King Y. Poon
*Assistant Examiner*—Saeid Ebrahimi
(74) *Attorney, Agent, or Firm*—Oblon, Spivak, McClelland, Maier & Neustadt, P.C.

(57) ABSTRACT

A process cartridge including a nonvolatile memory is removably mounted to an image forming apparatus also including a nonvolatile memory. Information representative of the conditions of use of the cartridge, which varies due to repeated operation, is written to both of the two memories. On the start-up of the apparatus, the information is first read out of the memory of the apparatus. Image forming conditions are set up in accordance with the amount of remaining toner and the cumulative number of prints output, which are included in the information, so that operating conditions are optimized in order to quicken image formation. Subsequently, the information is read out of the memory of the process cartridge and compared with the data stored in the memory of the apparatus. If the two data do not compare equal, then the data of the memory of the apparatus is updated in order to set new operating conditions.

18 Claims, 7 Drawing Sheets

FOREIGN PATENT DOCUMENTS

| | | |
|---|---|---|
| JP | 10-052964 | 2/1998 |
| JP | 2000-172133 | 6/2000 |

OTHER PUBLICATIONS

U.S. Appl. No. 10/874,269, filed Jun. 24, 2004, Murakami et al.
U.S. Appl. No. 09/994,620, filed Nov. 28, 2001, Hayashi et al.
U.S. Appl. No. 10/603,808, filed Jun. 26, 2003, Nagashima.
U.S. Appl. No. 09/994,620, filed Nov. 28, 2001, Hayashi et al.
U.S. Appl. No. 10/836,264, May 3, 2004, Shintani et al.
U.S. Appl. No. 09/994,620, filed Nov. 28, 2001, Hayashi et al.
U.S. Appl. No. 10/654,960, filed Sep. 5, 2003, Enami et al.
U.S. Appl. No. 09/994,620, filed Nov. 28, 2001, Pending.
U.S. Appl. No. 09/997,002, filed Nov. 30, 2001, Pending.
U.S. Appl. No. 09/994,620, filed Nov. 28, 2001, Hayashi et al.
U.S. Appl. No. 10/660,620, filed Sep. 12, 2003, Murakami et al.
U.S. Appl. No. 09/994,620, filed Nov. 28, 2001, Hayashi et al.
U.S. Appl. No. 10/665,286, filed Sep. 22, 2003, Sakai et al.
U.S. Appl. No. 09/994,620, filed Nov. 28, 2001, Hayashi et al.
U.S. Appl. No. 10/665,825, filed Sep. 22, 2003, Yoshizawa et al.
U.S. Appl. No. 09/994,620, filed Nov. 28, 2001, Hayashi et al.
U.S. Appl. No. 10/703,447, filed Nov. 10, 2003, Yoshiyuki et al.
U.S. Appl. No. 09/994,620, filed Nov. 28, 2001, Hayashi et al.
U.S. Appl. No. 10/737,867, filed Dec. 18, 2003, Hayashi et al.
U.S. Appl. No. 09/994,620, filed Nov. 28, 2001, Hayashi et al.
U.S. Appl. No. 10/820,726, filed Apr. 9, 2004, Koike et al.

* cited by examiner

FIG. 4

| ADDRESS | CONTENT |
|---|---|
| 0 | MACHINE ID |
| 1 | VERSION |
| 2 | MANUFACTURER |
| 3 | AREA |
| 4 | COLOR |
| 5 | SERIAL NO. |
| 6 | NUMBER OF TIMES OF RECYCLING |
| 7 | AMOUNT OF REMAINING TONER 1 |
| 8 | PRINT COUNTER 1 |

FIG. 5

| ADDRESS | CONTENT |
|---|---|
| 0 | FIXING TEMPERATURE |
| 1 | REGISTRATION POSITION |
| 2 | DENSITY |
| 3 | PRINTER COUNTER (TOP) |
| 4 | PRINTER COUNTER (CENTER) |
| 5 | PRINTER COUNTER (BOTTOM) |
| 6 | IMAGE TRANSFER MODE |
| 7 | AMOUNT OF REMAINING TONER 2 |
| 8 | PRINT COUNTER 2 |

| BODY MEMORY ADDRESS | CARTRIDGE MEMORY ADDRESS | UPDATE TABLE INFORMATION |
|---|---|---|
| 7 (AMOUNT OF REMAINING TONER 2) | 7 (AMOUNT OF REMAINING TONER 1) | TRUE (UPDATING) |
| 8 (PRINT COUNTER 2) | 8 (PRINT COUNTER 1) | FALSE (NO UPDATING) |

IMAGE FORMING APPARATUS AND REPLACEABLE PART AND INTEGRATED CIRCUIT CHIP FOR THE SAME

BACKGROUND OF THE INVENTION

1. Field of the Invention

The present invention relates to a printer, copier, facsimile apparatus or similar image forming apparatus of the type including a removable process cartridge or similar replaceable part. Also, the present invention relates to an image forming apparatus constructed to manage information particular to each replaceable part, which varies due to repeated operation, for thereby optimizing the operation of the individual replaceable part, and a replaceable part and an IC (Integrated Circuit) chip applicable thereto.

2. Description of the Background Art

In a printer or similar electrophotographic image forming apparatus, a photoconductive element, toner and so forth joining in an image forming process each are usable only for a preselected period due to wear and other causes. Such parts have customarily been constructed into replaceable process cartridges to be replaced by the user.

There is an increasing demand for an image forming apparatus implementing high image quality. As for an electrophotographic process, various devices have been proposed for high image quality in relation to process cartridges. A toner cartridge, for example, has a problem that toner density varies when the toner cartridge is new or approaches the end of the usable period. To solve this problem, toner in the toner cartridge is, e.g., agitated to uniform the toner density for thereby maintaining high image equality. To effect operation matching with instantaneous conditions of use, it is necessary to grasp the conditions of the individual toner cartridges and deliver information representative of the conditions, as needed. For this purpose, nonvolatile storing means may be built in each toner cartridge for storing, e.g., the condition of use of toner that varies due to a repeated image forming cycle. This allows operation specifications for maintaining high image quality to be determined in accordance with the stored data, thereby optimizing image forming conditions.

The cumulative number of prints output with a cartridge or replaceable part is one of data representative of the condition of use of the cartridge. The cumulative number of prints is written to storing means built in the cartridge. When the stored number of prints reaches a preselected number of prints, printing operation is effected with preselected specifications. For example, the fact that the stored number of prints has reached the preselected number of prints, i.e., the fact that the replaceable part has approached its limit of use is reported to a process controller or to the user.

Another requisite with an image forming apparatus is high-speed operation. Specifically, various devices have been proposed not only for increasing a print speed but also for reducing a first print time and a recovery time from an energy saving stand-by mode. The first print time refers to an interval between the power-on of the apparatus and the time when the apparatus outputs the first print. In the energy saving stand-by mode, the apparatus waits for an input while shutting off power supply to its sections other than a monitor section.

In a sense, however, the demand for high image quality and the demand for high-speed operation are contradictory to each other. Specifically, the extra operation of the apparatus for improving image quality, as distinguished from printing operation, extends an interval between the input of a print command and the output of a print. This obstructs high-speed operation and energy saving.

Assume that operation specifications are determined on the basis of management information, e.g., the condition of use of a cartridge for thereby optimizing image forming conditions, and that the management information is stored in storing means built in the cartridge, as stated earlier. Then, whether or not control for the optimization of image forming conditions is necessary or whether or not conditions set should be varied is determined in accordance with the information read out of the storing means. Such optimization is effected when an image is to be formed. More specifically, the optimization is part of initialization executed at the time of power-up or the recovery from the energy saving stand-by mode. Consequently, the optimization is apt to extend the first print time or the recovery time from the stand-by mode.

Technologies relating to the present invention are disclosed in, e.g., Japanese Patent Laid-Open Publication Nos. 8-69212, 10-52964 and 2000-172133.

SUMMARY OF THE INVENTION

It is therefore an object of the present invention to provide an image forming apparatus capable of quickening the start of printing by effecting rapid start-up processing, which includes the optimization of image forming conditions executed in accordance with management information stored in the memory of a replaceable part or process cartridge, a replaceable part for use in the image forming apparatus, and an IC (Integrated Circuit) chip.

In accordance with the present invention, an image forming apparatus includes an apparatus body, an image forming section at least partly implemented by a replaceable part removably mounted to the apparatus body, and a sensor responsive to the condition of use of the replaceable part that varies in accordance with the use of the apparatus body. A first and a second writable and readable non-volatile memory are built in the apparatus body and replaceable part, respectively. An accessing circuit accesses the first and second memories via a shared data bus. A controller senses, at the time of image formation, the variation of the condition of use of the replaceable part via the sensor. The controller then obtains information representative of a condition after use from the sensed variation. Subsequently, the controller writes, among the information, information relating to the operation specifications of the apparatus body in the second memory as well as in the first memory.

Also, in accordance with the present invention, in an IC chip connected to a CPU (Central Processing Unit), which is built in the apparatus body of an image forming apparatus, when mounted to the apparatus body and including a writable and readable nonvolatile memory accessible under the control of the CPU, an access to the memory is made via a data bus shared by the memory and a writable and readable nonvolatile memory built in the apparatus body. Among information representative of the condition of operation of the apparatus body that varies in accordance with the operation of the apparatus body, information relating to the operation specifications of the apparatus body is written to the memory of the IC chip when the IC chip is mounted to the apparatus body.

A replaceable part including the above-described IC chip is also disclosed.

BRIEF DESCRIPTION OF THE DRAWINGS

The above and other objects, features and advantages of the present invention will become more apparent from the following detailed description taken with the accompanying drawings in which:

FIG. 4 shows a data map stored in the memory of the process cartridge;

FIG. 5 shows a data map stored in a nonvolatile memory built in the apparatus;

DESCRIPTION OF THE PREFERRED EMBODIMENT

Figure 1:
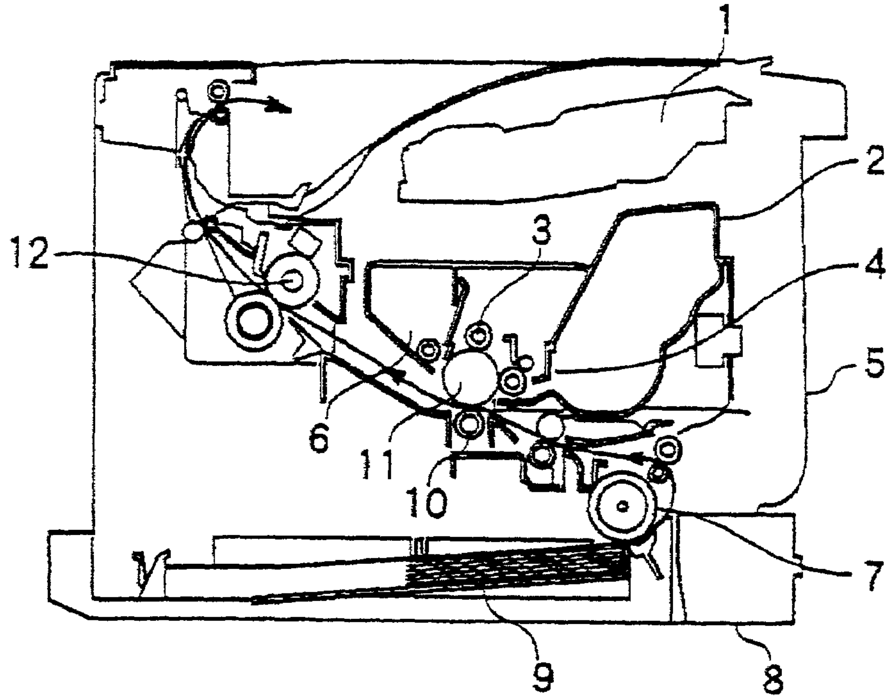
FIG. 1 is a view showing an image forming apparatus embodying the present invention.
Figure 2:
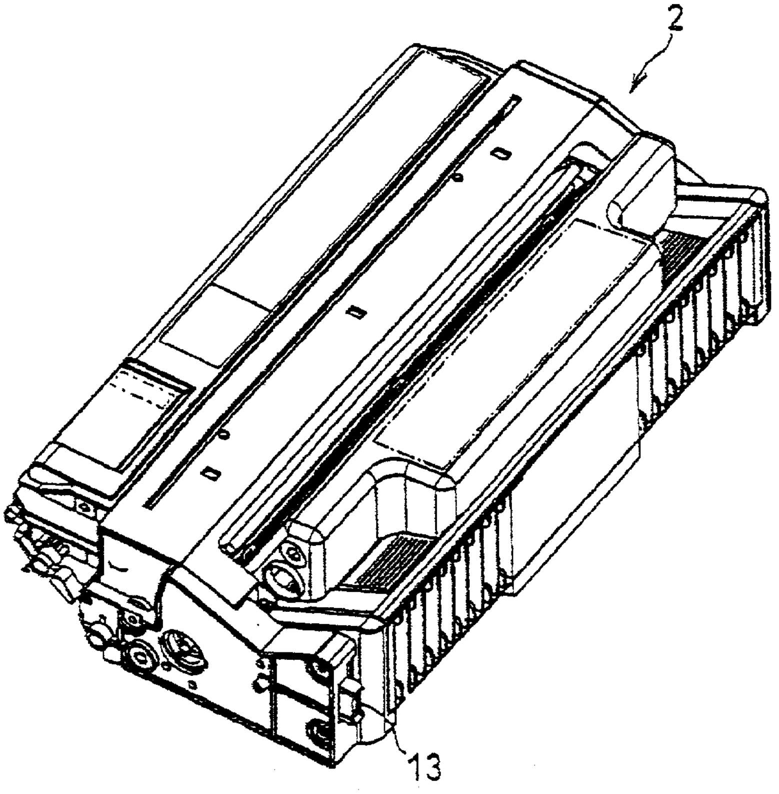
FIG. 2 is a perspective view of a process cartridge removably mounted to the apparatus shown in FIG. 1.

Referring to FIG. 1 of the drawings, an image forming apparatus embodying the present invention is shown and includes a process cartridge 2. The process cartridge is bodily removable from an apparatus body 5. FIG. 2 shows the process cartridge 2 in a perspective view.

As shown in FIG. 1, the process cartridge 2 includes a photoconductive drum 11, a charge roller 3, a waste toner collection chamber 6 accommodating cleaning means, and a toner chamber accommodating developing means. The process cartridge 2 executes a major part of an electrophotographic process. An optical writing unit 1 is arranged in the apparatus body 5 for scanning the drum 11 with a laser beam imagewise. The optical writing unit 1 includes a polygonal mirror, a motor for rotating the polygonal mirror, an F/θ lens, a laser diode, mirrors and so forth, although not shown specifically.

In operation, a pickup roller 7 pays out a sheet from a tray 8 toward the drum 11 in a direction indicated by an arrow in FIG. 1. While the drum 11 is rotated clockwise, as viewed in FIG. 1, the charge roller 3 uniformly charges the surface of the drum 11. The writing unit 1 scans the charged surface of the drum 11 with a laser beam in accordance with image data, thereby forming a latent image on the drum 11. The developing means positioned in the toner chamber 4 deposits its toner on the latent image to thereby form a corresponding toner image. An image transfer roller 10 transfers the toner image from the drum 11 to the sheet 9. The sheet 9 is then conveyed to a fixing roller 12 and has its toner image fixed thereby. The sheet 9 with the fixed toner image is driven out of the apparatus body 5.

As shown in FIG. 2, the process cartridge 2 includes a circuit board, not shown, and a connector 13 connected to the circuit board. An IC chip, not shown, is mounted on the circuit board and includes a readable and writable nonvolatile memory (cartridge memory hereinafter). The cartridge memory stores various kinds of data relating to the process cartridge.

FIG. 4 shows a specific data map stored in the cartridge memory and having addresses #0 through #8. As shown, data stored in the addresses #0 through #6 are not used for a control purpose, but are simply read out as information. Specifically, the addresses #0 through #6 respectively store a machine ID (identification), a version, a manufacturer, an area, a color, a manufacturer's serial number, and a number of times of recycling. The addresses #7 and #8 store the amount of remaining toner 1 and a cumulative print counter 1, respectively. The data stored in the addresses #7 #8 each are updated every time printing operation is effected, as will be described more specifically later. A controller, not shown, is mounted on the apparatus body 5 and includes a CPU (Central Processing Unit) for controlling the cartridge memory. When the process cartridge 2 is mounted to the apparatus body 5, the cartridge memory is connected to the CPU via the connector 13.

FIG. 5 shows a data map stored in a readable and writable nonvolatile memory, which is mounted on the apparatus body 5 (body memory hereinafter). As shown, addresses #7 and #8 store the amount of remaining toner 2 and a print counter 2 identical with the information stored in the addresses #7 and #8 of the cartridge memory. The amount of remaining toner 2 and print counter 2 are also updated every time printing operation is effected. Data stored in addresses #0 through #6 also relate to image forming operation and are used for control or updated. Specifically, the address #0 stores fixing temperature. The address #1 stores registration position adjustment used to match the position of an image and that of a sheet. The address #2 stores density that is an adjustment value for varying a bias for development to thereby control image density. The addresses #3, #4 and #5 are a printer counter (top), a printer counter (center) and a printer counter (bottom), respectively. While the addresses #7 and #8 store the same data as the addresses #7 and #8 of the cartridge memory, the addresses themselves are open to choice. The CPU of the controller controls not only the cartridge memory but also the body memory.

Figure 3:
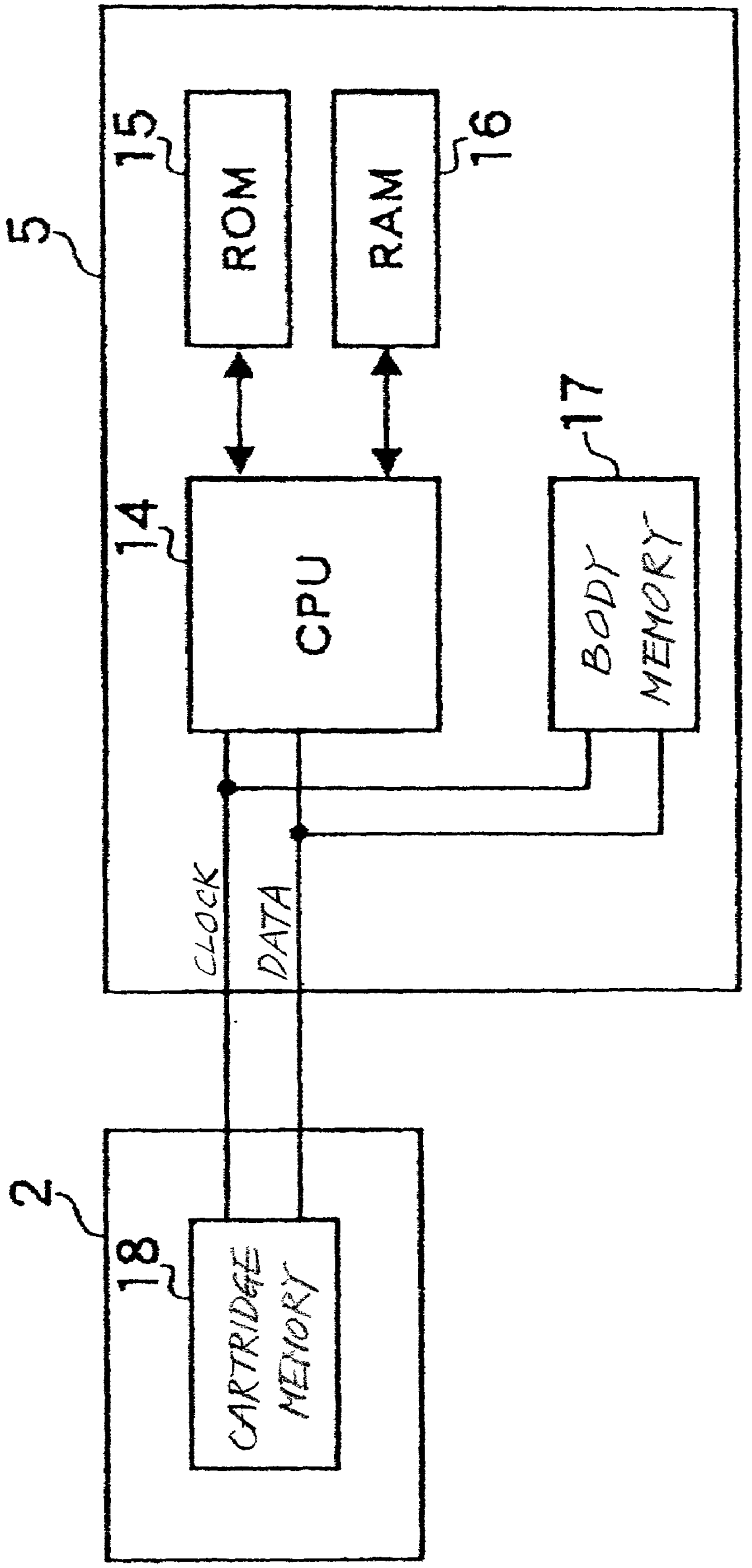
FIG. 3 is a schematic block diagram showing a relation between a nonvolatile memory built in the process cartridge and a controller mounted on the apparatus.

FIG. 3 shows a relation between the controller of the apparatus body 5 and the cartridge memory and body memory more specifically. As shown, the cartridge memory, labeled 18, is included in the process cartridge 2. The body memory, labeled 17, is mounted on the apparatus body 5. The cartridge memory 18 and body memory 17 each are implemented as an EEPROM (Electrically Erasable Programmable Read Only Memory). The CPU, labeled 14, of the apparatus body 5 controls both of the cartridge memory 18 and body memory 17. A ROM and a RAM (Random Access Memory) 16 are also mounted on the apparatus body 5 and store software and programming data under the control of the CPU 14.

In the illustrative embodiment, the cartridge memory 18 and body memory 17 each are implemented as a particular IC chip (memory chip. The two memories 18 and 17 are connected to the CPU 14 by an $I^2C$ bus. The $I^2C$ bus refers to a double-line serial bus made up of a clock line and a data line for serial communication.

Hereinafter will be described how the illustrative embodiment optimizes image forming conditions in accordance with operation specifications, which are determined by management information including the conditions of use of replaceable parts. Briefly, the illustrative embodiment determines, based on the management information, whether or not optimization is necessary or whether or not a control procedure should be varied. Subsequently, the illustrative embodiment distributes, when executing operation in accordance with the result of decision, processing to the cartridge memory 18 and body memory 17, thereby speeding up the processing.

To obtain data necessary for control from the cartridge memory 18 and body memory 17, the CPU 14 accesses the body memory 17 to read control data out (FIG. 5) thereoutof and transfers the control data to the RAM 16. The CPU 14 is connected to the body memory 17 by the serial bus, i.e., one data line and one clock line, as stated earlier. Therefore, it takes a longer period of time for the CPU 14 to obtain the control data than when the CPU 14 is connected to the body memory 17 by a parallel bus. This is also true when the CPU 14 reads control data out of the cartridge memory 18. Moreover, the CPU 14 cannot obtain the control data from both of the body memory 17 and cartridge memory 18 at the same time.

It has therefore been customary for the CPU 14 to obtain control data from the body memory 17 and then from the cartridge memory 18. This extends a period of time up to the start of a control procedure.

Further, when a door, not shown, mounted on the apparatus body 5 is left open at the time of mounting or dismounting of the process cartridge 2, the CPU 14 cannot communicate with the cartridge memory 18. More specifically, assume that an arrangement is made such that the connector 13 is disconnected when the door is open and connected when it is closed. Then, the circuit board of the process cartridge 2 loaded with the cartridge memory 18 is electrically connected to the CPU 14 only when the door is closed. In such a case, an extra period of time is necessary for the CPU 14 to determine whether or not the door is closed. Generally, several seconds is assigned to this decision in order to obviate chattering and in consideration of the start-up time of a power supply, further extending the processing time.

In light of the above, in the illustrative embodiment, immediately after obtaining the control data from the body memory 17, the CPU 14 starts executing a control procedure by using the control data. The control data refer to the remaining amount of toner 2 and print counter 2 (FIG. 5). The CPU 14 can therefore optimize image forming conditions immediately and thereby quickens printing operation.

A specific procedure in which the optimization of image forming conditions is executed when the apparatus is switched on will be described hereinafter. Executing the optimization at such a timing is desirable because the apparatus becomes ready to set up image forming conditions in accordance with the operator's command at the time of power-up. The control procedure will be described with reference to FIG. 6 hereinafter. The CPU 14 executes the control procedure to be described as part of the initialization of the apparatus.

Figure 6:
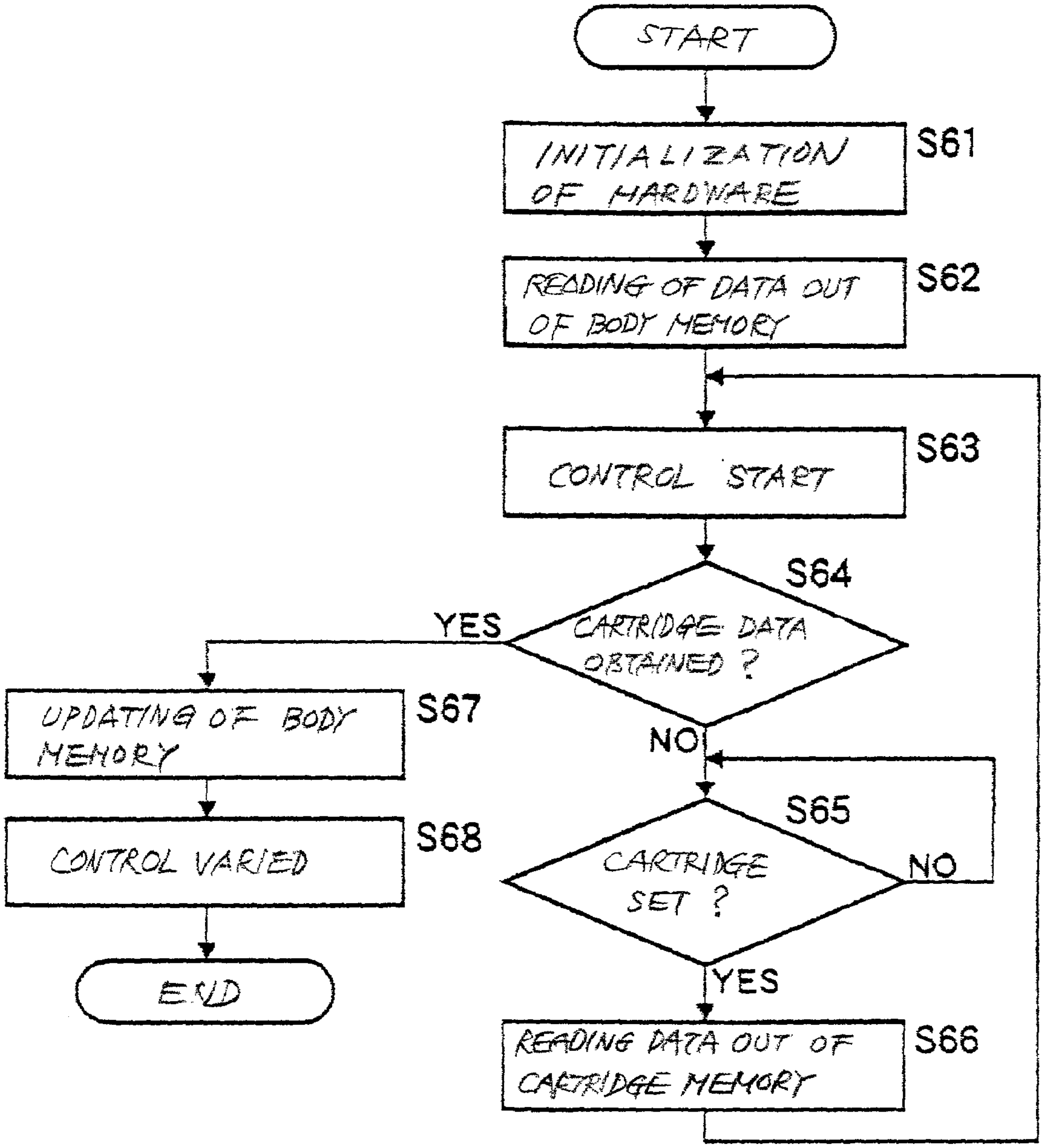
FIG. 6 is a flowchart demonstrating a specific operation of the controller for optimizing image forming conditions at the time of power-up of the apparatus.

As shown in FIG. 6, the CPU 14 first initializes hardware built in the apparatus body 5 (step S61). As a result, the controller of the apparatus body 5 becomes ready to execute control. The CPU 14 reads various data (FIG. 5) out of the body memory 17 (step S62). The control data contained in the above data determine control values assigned to the various sections of the apparatus body 5. The CPU 14 sets such control values and then starts controlling fixation, sensing of the amount of remaining toner and so forth (step S63).

Subsequently, the CPU 14 determines whether or not data (FIG. 4) have been read out of the cartridge memory 18, i.e., whether or not the data read out of the memory 18 are stored in the RAM 16 (step S64). If the answer of the step S64 is negative (NO), then it is likely that the process cartridge 2 is absent in the apparatus body 5 or that the door is open. In this case, the CPU 14 waits until the process cartridge 2 has been mounted to the apparatus body 5 (step S65). If the process cartridge 2 is amounted to the apparatus body 5 (YES, step S65), then the CPU 14 reads the data out of the cartridge memory 18 (step S66) The procedure returns from the step S66 to the step S63.

If the answer of the step S64 is YES, the CPU 14 updates the amount of remaining toner 2 and print counter 2 with the amount of remaining toner 1 and print counter 1, respectively. The CPU 14 then varies control to follow (step S67). More specifically, if the data read out of the body memory 17 are different from the data read out of the cartridge memory 18, then the CPU 14 updates the former with the latter.

The optimization of image forming conditions unique to the illustrative embodiment is based on the management information relating to the process cartridge 2. It is therefore rational to start the optimization at the time when the process cartridge 2 is mounted to the apparatus body 5. It follows that the optimization should preferably be executed not only at the time of power-up but also when the process cartridge 2 is mounted to the apparatus body 5. More specifically, the process cartridge 2 is sometimes mounted to the apparatus body 5 after the apparatus body 5 has been switched on. Therefore, assuming that the door is opened for mounting the process cartridge 2 and then closed, the CPU 14 may start the optimization on sensing closing of the door. This alternative procedure is identical with the procedure of FIG. 6 except for the omission of the step S61.

A specific procedure in which the CPU 14 optimizes image forming conditions in accordance with the data read out of the cartridge memory 18 or the body memory 17 and representative of the conditions of use will be described hereinafter. The conditions of use refer to the remaining amount of toner and print counter. It is to be noted that the print counter refers to the cumulative number of prints produced with the process cartridge 2.

Figure 9:
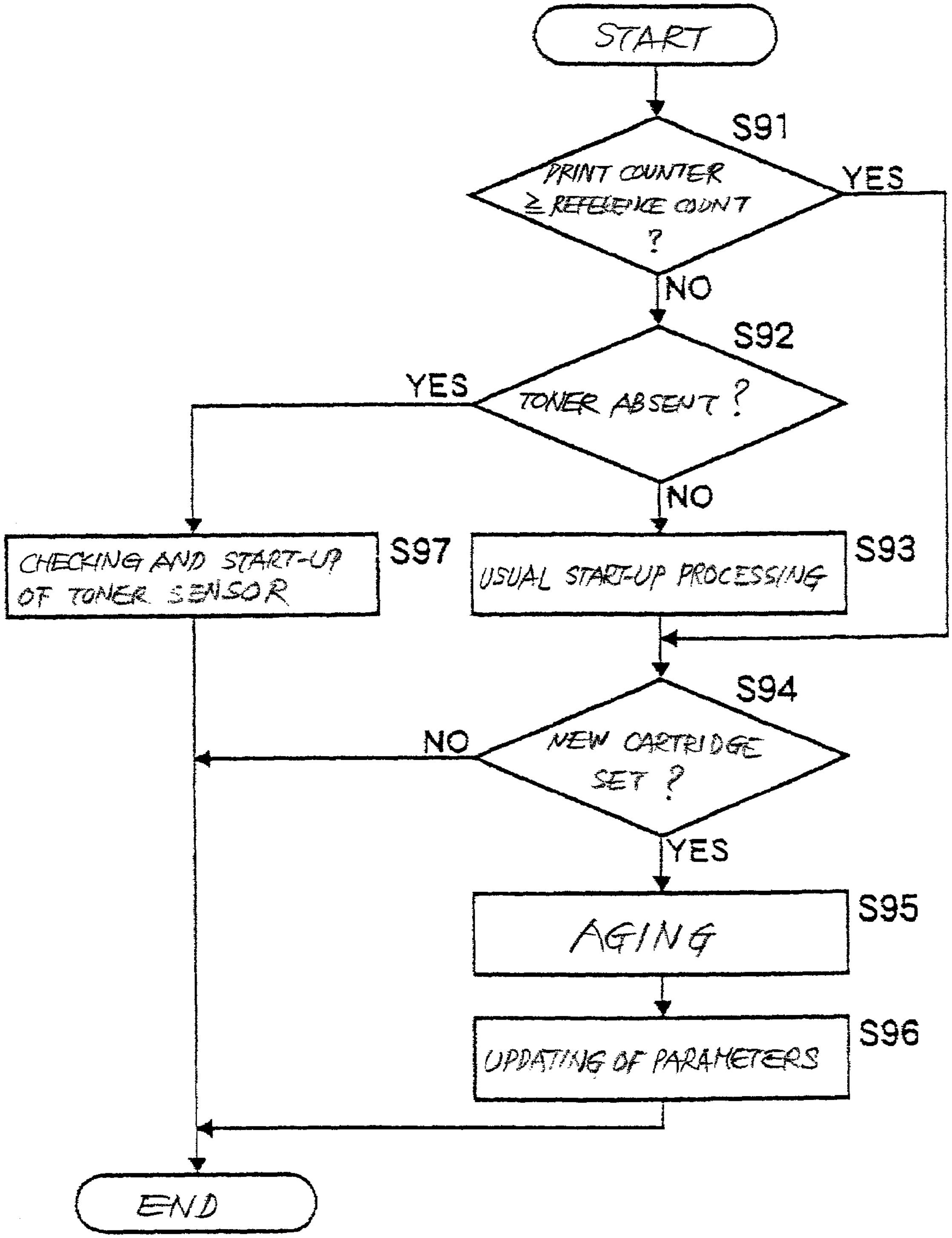
FIG. 9 is a flowchart showing still another specific operation of the controller for optimizing image forming conditions in accordance with data read out of the memory of the process cartridge and or the memory of the apparatus.

Specifically, as shown in FIG. 9, the CPU 14 determines whether or not the print counter 1 or 2 read out of the cartridge memory 18 or the body memory 17, respectively, is coincident with a preselected reference number (step S91). The print counter 1 or 2 shows one condition of the last use of the process cartridge 2. The preselected reference number is representative of a limit estimated from the cumulative number of prints output with the process cartridge 2. If the answer of the step S91 is YES, then the CPU 14 determines whether or not the process cartridge 2 has been replaced with a new process cartridge (step S94). If the answer of the step S94 is NO, then the procedure returns to the step S91.

If the answer of the step S91 is NO, then the CPU 14 determines the amount of remaining toner 1 or 2 read out of the process cartridge 18 or the body cartridge 17 as another condition of the last use of the process cartridge 2 (step S92). In this specific procedure, the CPU 14 determines whether or not toner is absent. If toner is absent (YES, step S92), then the CPU 14 checks the condition of a toner sensor responsive to the amount of toner and then executes start-up processing (step S97). More specifically, the CPU 14 causes a motor, which agitates toner, to rotate over a longer period of time than usual and executes sampling for guaranteeing the expected function of the toner sensor. The CPU 14 then determines whether or not the answer of the step S92 changes from YES to NO.

If the answer of the step S92 is NO, meaning that toner is present, then the CPU 14 executes usual start-up processing (step S93). After the step S93, the CPU 14 again determines whether or not the process cartridge 2 has been replaced with new one (step S94). If the answer of the step S94 is YES, then the CPU 14 drives the motor for agitating toner for a preselected period of time to thereby effect aging (step S95). At this instant, management data stored in the cartridge memory 18 of the new process cartridge are not supported as the operating conditions of the apparatus body 5. The CPU 14 therefore updates the parameters with the data stored in the cartridge memory 18 of the new process cartridge (step S96).

Figures 7, 8:
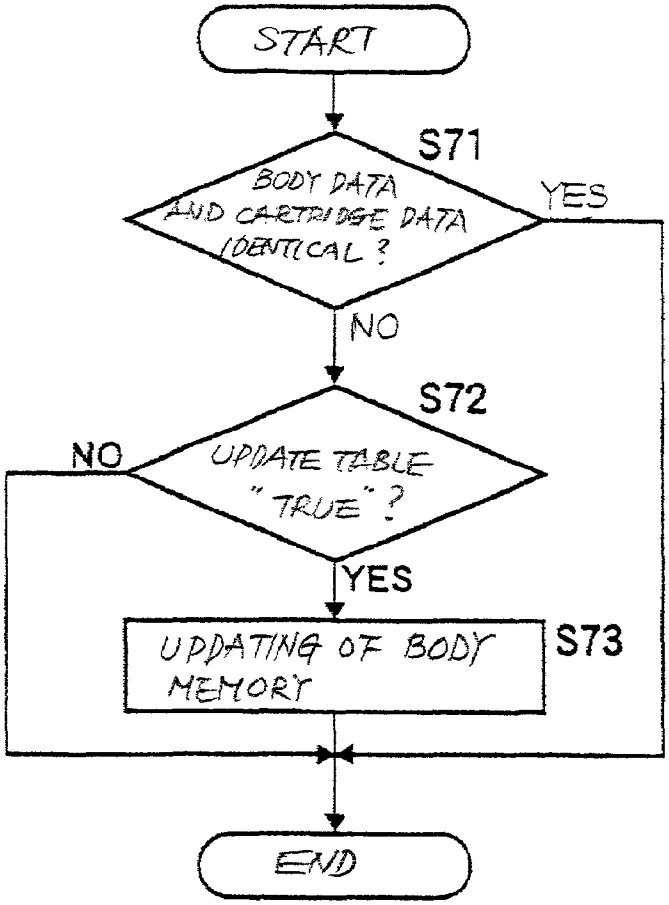
FIG. 7 is a flowchart demonstrating another specific operation of the controller for updating data stored in the memory of the apparatus with the data of the memory of the process cartridge.
FIG. 8 shows a specific update table applicable to the operation of FIG. 7.

FIG. 7 shows another specific procedure for optimization effected at the time of power-up or at the time of mounting of the process cartridge 2. In the procedure described with reference to FIG. 9, after the CPU 14 has started control based on data read out of the body memory 17, the CPU 14 reads data out of the cartridge memory 18. The CPU 14 then compares the data read out of the cartridge memory 18 with the data read out of the body memory 17. If the two data do not compare equal, then the CPU 14 updates the control parameters based on the data of the body memory 17 with the data of the cartridge memory 18. By contrast, in the procedure shown in FIG. 7, the CPU 14 determines whether or not the data should be updated beforehand, and can select operation that does not update the data. The procedure shown in FIG. 7 is substituted for the step S67 included in the procedure of FIG. 6, which is executed at the time of power-up.

As shown in FIG. 7, the CPU 14 determines whether or not the data of the body memory 17 and the data of the cartridge memory 18 are identical with each other (step S71). If the two kinds of data are identical (YES, step S71), then the CPU 17 ends the procedure of FIG. 7. If the answer of the step S71 is NO, meaning that the amounts of remaining toner 1 and 2 and print counters 1 and 2 both are different from each other, then the CPU 14 looks up an update table item by item and selectively executes updating.

FIG. 8 shows a specific update table and indicates that the amounts of remaining toner 1 and 2 and print counters 1 and 2 both are different from each other by way of example. As for the amount of remaining toner, the information of the update table indicates "true", i.e., indicates that the data of the body memory 17 should be updated by the data of the cartridge memory 18. On the other hand, as for the print counter, the information of the update table is "false", i.e., indicates that the data of the body memory 17 does not have to be updated.

More specifically, if the answer of the step S71 is NO, then the CPU 14 looks up the update data to see if the information of the update table is "true" item by item (step S72). If the answer of the step S72 is YES, then the CPU 14 updates the data of the body memory 17 with the data of the cartridge memory 18; if otherwise, the CPU 14 simply uses the data of the body memory 17.

Figure 10:
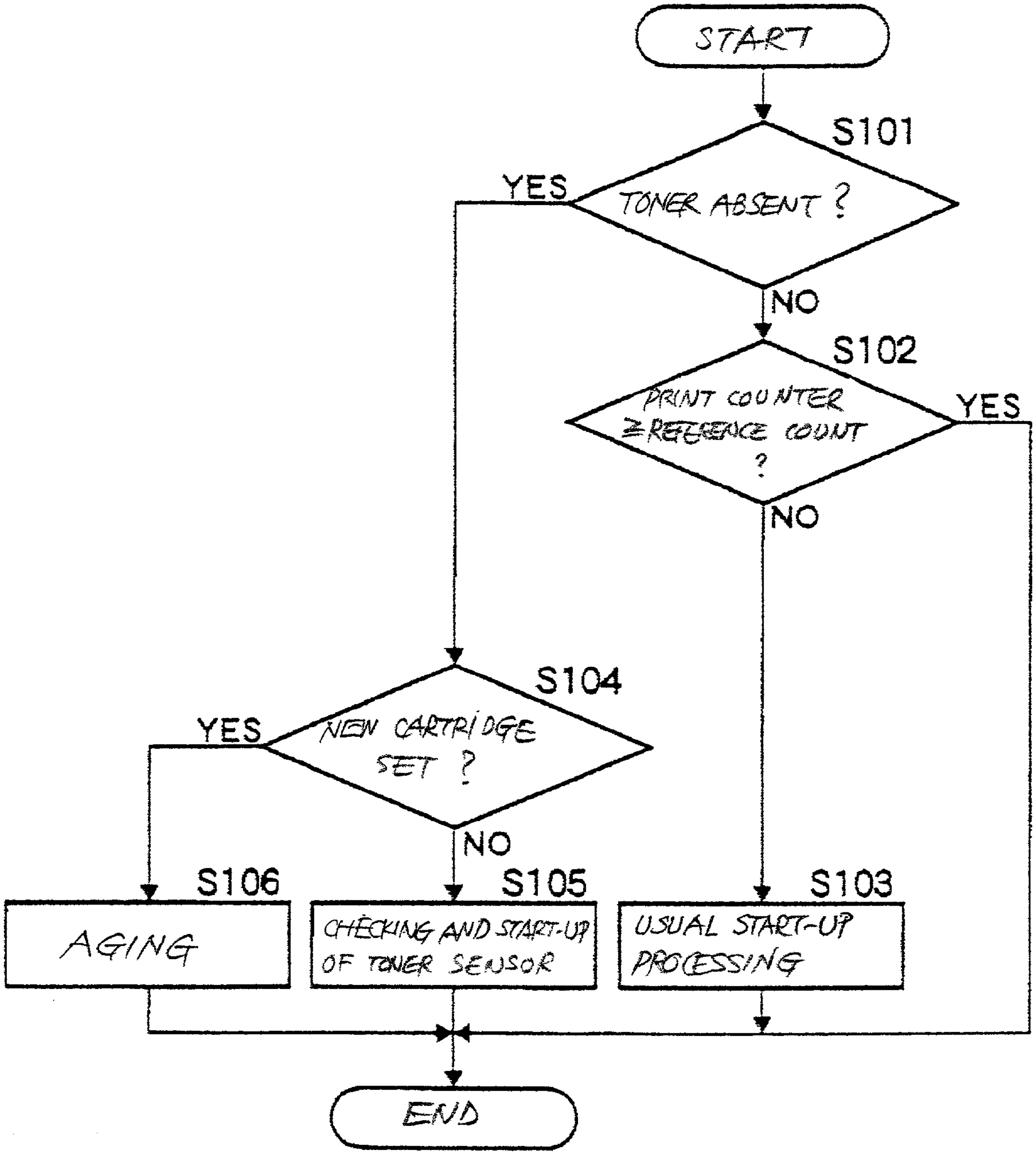
FIG. 10 is a flowchart showing a further specific operation of the controller for optimizing image forming conditions in accordance with data read out of the memory of the process cartridge and or the memory of the apparatus.

FIG. 10 shows another specific procedure in which the CPU 14 optimizes image forming conditions in accordance with the data read out of the cartridge memory 18 or the body memory 17 and representative of the conditions of use.

As shown, the CPU 14 first determines the amount of remaining toner by reading it out of the cartridge memory 18 or the body memory 17 (step S101). More specifically, the CPU 14 determines whether or not toner is absent. If the answer of the step S101 is NO, then the CPU 14 determines whether or not the print counter read out of the cartridge memory 18 or the body memory 17 has reached a preselected count (step S102). Again, the preselected count is representative of a limit estimated from the cumulative number of prints output with the process cartridge 2.

If the answer of the step S102 is YES, then the CPU 14 simply ends the procedure of FIG. 10. The step S102 is useful because if the print counter is derived from the body memory 17, then the print data is not always reliable. By clearing the counter, it is possible to again make the apparatus body usable. This is done by another operation, e.g., manual counter clearing operation performed on an operation panel not shown.

If the answer of the step S102 is NO, then the CPU 14 executes usual start-up processing (step S103) and then ends the procedure.

Assume that no toner is left (YES, step S101). Then, the CPU 14 determines whether or not the process cartridge 2 is replaced with a new process cartridge (step S104). If the answer of the step S104 is NO, then the CPU 14 checks the condition of the toner sensor responsive to the amount of toner and then executes start-up processing (step S105). More specifically, the CPU 14 causes the motor, which agitates toner, to rotate over a longer period of time than usual and executes sampling for guaranteeing the expected function of the toner sensor. The CPU 14 then determines whether or not the answer of the step S101 changes from YES to NO.

The illustrative embodiment has concentrated on a replaceable part (cartridge) including a photoconductive drum, a charge roller, toner and so forth for an electrophotographic process, and a procedure relating to the conditions of use of the toner. The replaceable part may alternatively be implemented as a toner cartridge (toner bottle), photoconductive drum unit or similar single part, if desired. Further, the illustrative embodiment is applicable even to an ink jet type of image forming apparatus, in which case the replaceable part will be implemented as an ink cartridge.

In summary, it will be seen that the present invention provides an image forming apparatus, a replaceable part and an IC chip for image formation capable of reducing a start-up time and setting up adequate image forming conditions. Further, the present invention can store and manage user-by-user information that varies in accordance with the operation of the apparatus. In addition, the present invention can store and manage part-by-part information that varies with the operation of the apparatus and can set adequate image forming conditions.

Various modifications will become possible for those skilled in the art after receiving the teachings of the present disclosure without departing from the scope thereof.

What is claimed is:

1. An image forming apparatus comprising:

an apparatus body;

image forming means at least partly implemented by a replaceable part, which is removably mounted to said apparatus body;

sensing means for sensing a condition of use of the replaceable part that varies in accordance with use of said apparatus body;

first writable and readable non-volatile storing means in said apparatus body;

second writable and readable non-volatile storing means in the replaceable part;

accessing means for accessing said first storing means and said second storing means via a shared data bus; and control means for sensing, at a time of image formation, a variation of the condition of use of the replaceable part via said sensing means, obtaining information representative of a condition after use from a sensed variation, writing, among said information, information relating to in-use operation specifications of said apparatus body in said second storing means as well as in said first storing means, said control means configured to perform a comparison of the in-use operation specifications stored between the first and second storing means, and based on the comparison to determine whether the image forming means is in an operational state.

2. The apparatus as claimed in claim 1, wherein said control means determines, when an image forming operation begins, initial operation specifications in accordance with the information stored in said first storing means and representative of a condition of the last use, causes said apparatus body to start operating under image forming conditions based on said initial operation specifications, and again sets, if the condition of the last use stored in said first storing means and the condition of the last use stored in said second storing means do not compare equal, image forming conditions in accordance with new operation specifications based on said condition stored in said second storing means.

3. The apparatus as claimed in claim 1, wherein said control means determines, when an image forming operation begins, initial operation specifications in accordance with the information stored in said first storing means and representative of a condition of the last use, causes said apparatus body to start operating under image forming conditions based on said initial operation specifications, and again determines, if the condition of the last use stored in said first storing means and the condition of the last use stored in said second storing means do not compare equal, whether or not to again set image forming conditions in accordance with new operation specifications based on said condition stored in said second storing means.

4. The apparatus as claimed in claim 3, wherein when the information stored in each of said first storing means and said second storing means is representative of a plurality of conditions after the last use, said control means determines whether or not to again set image forming conditions condition by condition.

5. In an IC (Integrated Circuit) chip connected to a CPU (Central Processing Unit), which is in an apparatus body of an image forming apparatus, when mounted to said apparatus body, comprising:

writable and readable nonvolatile storing means accessible under a control of said CPU, an access to said nonvolatile storing means is made via a data bus shared by said nonvolatile storing means and writable and readable nonvolatile storing means built in said apparatus body, and said storing means configured to store among information representative of a condition of operation of said apparatus body that varies in accordance with an operation of said apparatus body, information relating to in-use operation specifications of said apparatus body when said IC chip is mounted to said apparatus body, said CPU configured to perform a comparison of the in-use operation specifications stored between the storing means built in said apparatus body and the storing means of said IC chip, and based on the comparison to determine whether the image forming apparatus is in an operational state.

6. In a replaceable part for an image forming apparatus including image forming means that is at least partly removable from an apparatus body of said image forming apparatus, said replaceable part comprising:

an IC chip connected to a CPU, which is in said apparatus body, when mounted to said apparatus body and including writable and readable nonvolatile storing means accessible under a control of said CPU, an access to said nonvolatile storing means is made via a data bus shared by said nonvolatile storing means and writable and readable nonvolatile storing means built in said apparatus body, and said storing means configured to store among information representative of a condition of operation of said apparatus body that varies in accordance with an operation of said apparatus body, information relating to in-use operation specifications of said apparatus body is mounted to said apparatus body, said control means configured to perform a comparison of the in-use operation specifications stored between the storing means built in said apparatus body and the storing means of said IC chip, and based on the comparison to determine whether the image forming means is in an operational state.

7. An image forming apparatus comprising:

an apparatus body;

an image forming unit at least partly implemented by a replaceable part, which is removably mounted to said apparatus body;

sensor configured to sense a condition of use of the replaceable part that varies in accordance with use of said apparatus body;

a first writable and readable non-volatile memory unit in said apparatus body;

a second writable and readable non-volatile memory unit in the replaceable part;

an accessing unit configured to access said first memory unit and said second memory unit; and a controller configured to sense, at a time of image formation, a variation of the condition of use of the replaceable part via said sensor, obtain information representative of a condition after use from a sensed variation, and write, among said information, information relating to in-use operation specifications of said apparatus body in said second memory unit as well as in said first memory unit, said controller configured to perform a comparison of the in-use operation specifications stored between the first and second memory units and based on the comparison to determine whether the image forming apparatus is in an operational state.

8. An apparatus comprising:

an apparatus body;

operating means at least partly implemented by a replaceable part, which is removably mounted to said apparatus body;

sensing means for sensing a condition of use of the replaceable part that varies in accordance with use of said apparatus body;

first writable and readable non-volatile storing means in said apparatus body;

second writable and readable non-volatile storing means in the replaceable part;

accessing means for accessing said first storing means and said second storing means via a shared data bus;

and control means for sensing, at a time of operation, a variation of the condition of use of the replaceable part via said sensing means, obtaining information representative of a condition after use from a sensed variation, writing, among said information, information relating to in-use operation specifications of said apparatus body in said second storing means as well as in said first storing means, said control means configured to perform a comparison of the in-use operation specifications stored between the first and second storing means, and based on the comparison to determine whether the operating means is in an operation state.

9. The apparatus as claimed in claim 8, wherein said control means determines, when the operation begins, initial operation specifications in accordance with the information stored in said first storing means and representative of a condition of the last use, causes said apparatus body to start operating under operating conditions based on said initial operation specifications, and again sets, if the condition of the last use stored in said first storing means and the condition of the last use stored in said second storing means do not compare equal, operating condition in accordance with new operation specifications based on said condition stored in said second storing means.

10. The apparatus as claimed in claim 8, wherein said control means determines, when the operating begins, initial operation specifications in accordance with the information stored in said first storing means and representative of a condition of the last use, causes said apparatus body to start operating under operating conditions based on said initial operation specifications, and again determines, if the condition of the last use stored in said first storing means and the condition of the last use stored in said second storing means do not compare equal, whether or not to again set operating conditions in accordance with new operation specifications based on said condition stored in said second storing means.

11. The apparatus as claimed in claim 10, wherein when the information stored in each of said first storing means and said second storing means is representative of a plurality of conditions after the last use, said control means determines whether or not to again set operating conditions condition by condition.

12. In an IC (Integrated Circuit) chip connected to a CPU (Central Processing Unit), in an apparatus body of an apparatus, and mounted to said apparatus body, comprising:

writable and readable nonvolatile storing means accessible under a control of said CPU, an access to said non-volatile storing means is made via a data bus shared by said non-volatile storing means and writable and readable non-volatile storing means built in said apparatus body;

said storing means configured to store, among information representative of a condition of operation of said apparatus body that varies in accordance with an operation of said apparatus body, information relating to in-use operation specifications of said apparatus body when said IC chip is mounted to said apparatus body; and said CPU configured to perform a comparison of the in-use operation specifications stored between the storing means in said apparatus body and the storing means of said IC chip, and based on the comparison to determine whether the apparatus is in an operating state.

13. In a replaceable part for an apparatus including operating means that is at least partly removable from an apparatus body of said apparatus, said replaceable part comprising:

an IC chip connected to a CPU, which is in said apparatus body, when mounted to said apparatus body and includes writable and readable non-volatile storing means accessible under a control of said CPU, an access to said non-volatile storing means is made via a data bus shared by said non-volatile storing means and writable and readable non-volatile storing means in said apparatus body; and said storing means configured to store, among information representative of a condition of operation of said apparatus body that varies in accordance with an operation of said apparatus body, information relating to in-use operation specifications of said apparatus body is written to said storing means of said IC chip when said IC chip is mounted to said apparatus body; and said control means configured to perform a comparison of the in-use operation specifications stored between the storing means in said apparatus body and the storing means of said IC chip, and based on the comparison to determine whether the operating means is in an operating state.

14. An apparatus comprising:

an apparatus body;

an operating unit at least partly implemented by a replaceable part, which is removably mounted to said apparatus body;

a sensor configured to sense a condition of use of the replaceable part that varies in accordance with use of said apparatus body;

a first writable and readable non-volatile memory unit in said apparatus body;

a second writable and readable non-volatile unit in the replaceable part;

an accessing unit configured to access said first memory and said second memory unit; and a controller configured to sense, at a time of operation, a variation of the condition of use of the replaceable part via said sensor, obtain information representative of a condition after use from a sensed variation, and write, among said information, information relating to in-use operation specifications of said apparatus body in said second memory unit as well as in said first memory unit, said controller configured to perform a comparison of the in-use operation specifications stored between the first and second memory units and based on the comparison to determine whether the apparatus is in an operational state.

15. An image forming apparatus comprising:

an apparatus body;

image forming means at least partly implemented by a replaceable part, which is removably mounted to said apparatus body;

sensing means for sensing a condition of use of the replaceable part that varies in accordance with use of said apparatus body;

first writable and readable non-volatile storing means in said apparatus body;

second writable and readable non-volatile storing means in the replaceable part;

accessing means for accessing said first storing means and said second storing means via a shared data bus; and control means for sensing, at a time of image formation, a variation of the condition of use of the replaceable part via said sensing means, obtaining information representative of a condition after use from a sensed variation, writing, among said information, information relating to operation specifications of said apparatus body in said second storing means as well as in said first storing means, said control means configured to perform a comparison of the operation specifications stored between the first and second storing means, and based on the comparison to determine whether the image forming means is in an operational state, wherein said control means determines, when an image forming operation begins, operation specifications in accordance with the information stored in said first storing means and representative of a condition of the last use, causes said apparatus body to start operating under image forming conditions based on said operation specifications, and again sets, if the condition of the last use stored in said first storing means and the condition of the last use stored in said second storing means do not compare equal, image forming conditions in accordance with new operation specifications based on said condition stored in said second storing means.

16. An image forming apparatus comprising:

an apparatus body;

image forming means at least partly implemented by a replaceable part, which is removably mounted to said apparatus body;

sensing means for sensing a condition of use of the replaceable part that varies in accordance with use of said apparatus body;

first writable and readable non-volatile storing means in said apparatus body;

second writable and readable non-volatile storing means in the replaceable part;

accessing means for accessing said first storing means and said second storing means via a shared data bus; and control means for sensing, at a time of image formation, a variation of the condition of use of the replaceable part via said sensing means, obtaining information representative of a condition after use from a sensed variation, writing, among said information, information relating to operation specifications of said apparatus body in said second storing means as well as in said first storing means, said control means configured to perform a comparison of the operation specifications stored between the first and second storing means, and based on the comparison to determine whether the image forming means is in an operational state, wherein said control means determines, when an image forming operation begins, operation specifications in accordance with the information stored in said first storing means and representative of a condition of the last use, causes said apparatus body to start operating under image forming conditions based on said operation specifications, and again determines, if the condition of the last use stored in said first storing means and the condition of the last use stored in said second storing means do not compare equal, whether or not to again set image forming conditions in accordance with new operation specifications based on said condition stored in said second storing means.

17. An apparatus comprising:

an apparatus body;

operating means at least partly implemented by a replaceable part, which is removably mounted to said apparatus body;

sensing means for sensing a condition of use of the replaceable part that varies in accordance with use of said apparatus body;

first writable and readable non-volatile storing means in said apparatus body;

second writable and readable non-volatile storing means in the replaceable part;

accessing means for accessing said first storing means and said second storing means via a shared data bus;

and control means for sensing, at a time of operation, a variation of the condition of use of the replaceable part via said sensing means, obtaining information representative of a condition after use from a sensed variation, writing, among said information, information relating to operation specifications of said apparatus body in said second storing means as well as in said first storing means, said control means configured to perform a comparison of the operation specifications stored between the first and second storing means, and based on the comparison to determine whether the operating means is in an operation state, wherein said control means determines, when the operation begins, operation specifications in accordance with the information stored in said first storing means and representative of a condition of the last use, causes said apparatus body to start operating under operating conditions based on said operation specifications, and again sets, if the condition of the last use stored in said first storing means and the condition of the last use stored in said second storing means do not compare equal, operating condition in accordance with new operation specifications based on said condition stored in said second storing means.

18. An apparatus comprising:

an apparatus body;

operating means at least partly implemented by a replaceable part, which is removably mounted to said apparatus body;

sensing means for sensing a condition of use of the replaceable part that varies in accordance with use of said apparatus body;

first writable and readable non-volatile storing means in said apparatus body;

second writable and readable non-volatile storing means in the replaceable part;

accessing means for accessing said first storing means and said second storing means via a shared data bus;

and control means for sensing, at a time of operation, a variation of the condition of use of the replaceable part via said sensing means, obtaining information representative of a condition after use from a sensed variation, writing, among said information, information relating to operation specifications of said apparatus body in said second storing means as well as in said first storing means, said control means configured to perform a comparison of the operation specifications stored between the first and second storing means, and based on the comparison to determine whether the operating means is in an operation state, wherein said control means determines, when the operating begins, operation specifications in accordance with the information stored in said first storing means and representative of a condition of the last use, causes said apparatus body to start operating under operating conditions based on said operation specifications, and again determines, if the condition of the last use stored in said first storing means and the condition of the last use stored in said second storing means do not compare equal, whether or not to again set operating conditions in accordance with new operation specifications based on said condition stored in said second storing means.

* * * * *